Nov. 24, 1925.
A. W. AINSWORTH
1,562,936
WEIGHING INSTRUMENT
Filed Dec. 22, 1920
3 Sheets-Sheet 1
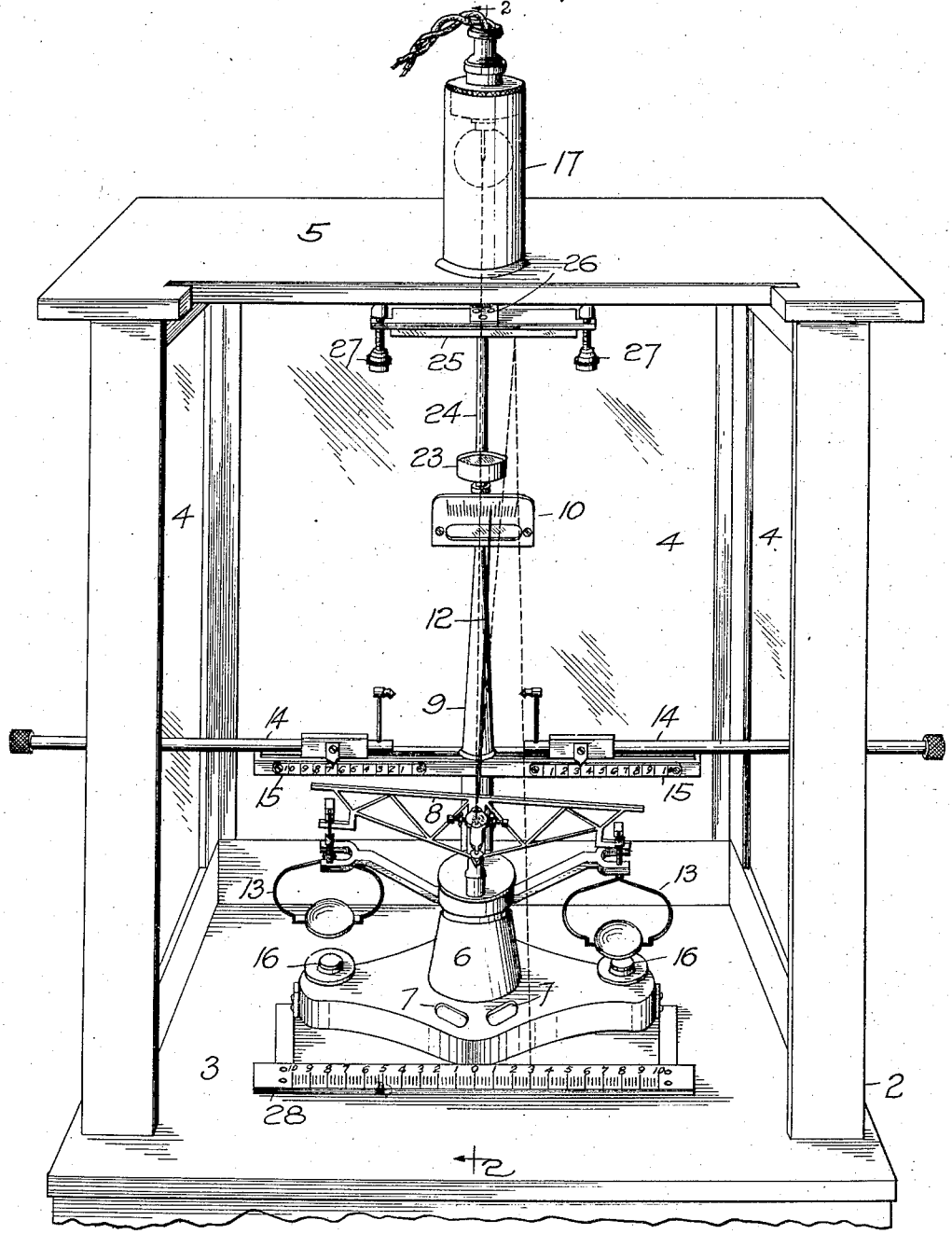
INVENTOR.
A.W. AINSWORTH.
BY
ATTORNEY.

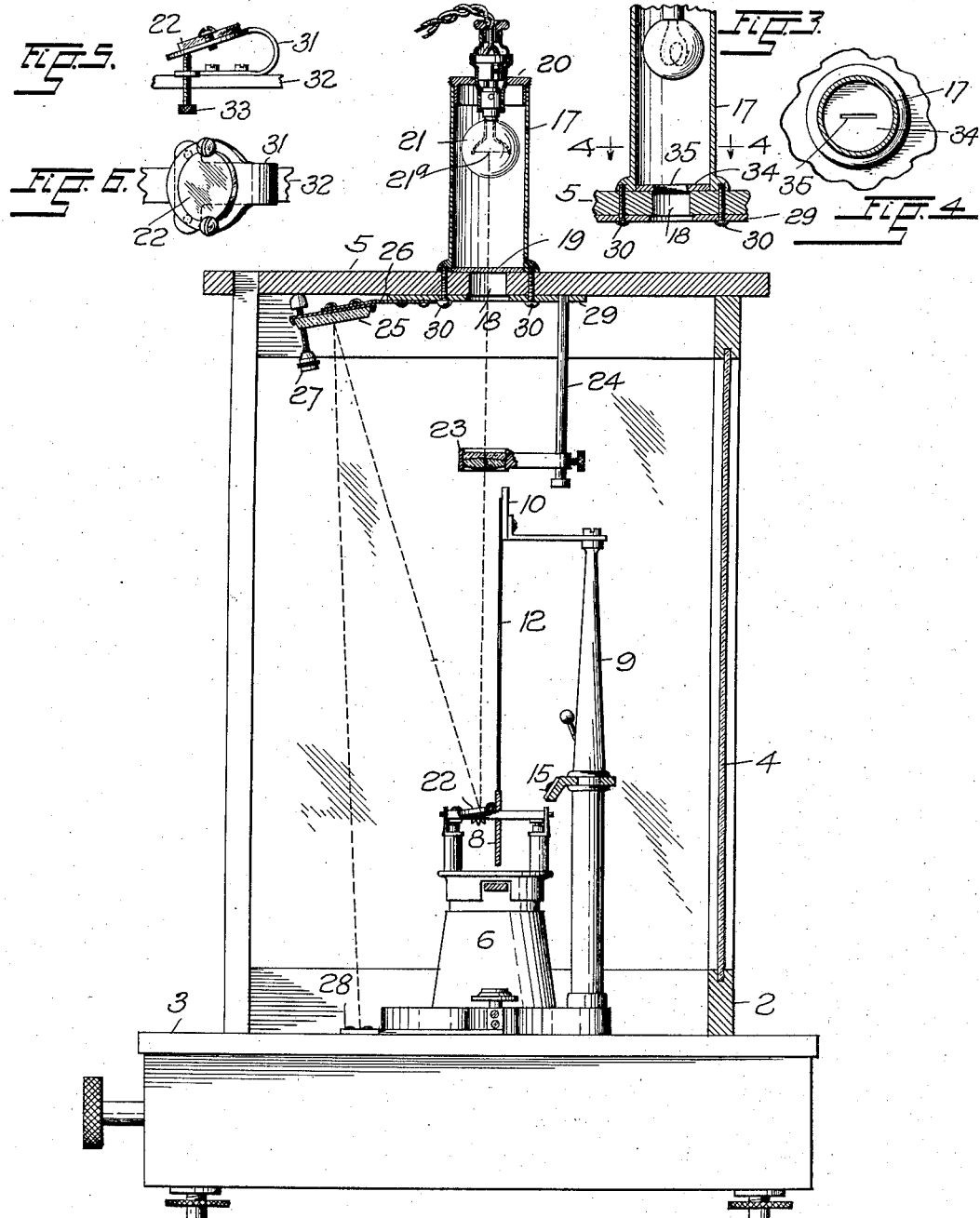

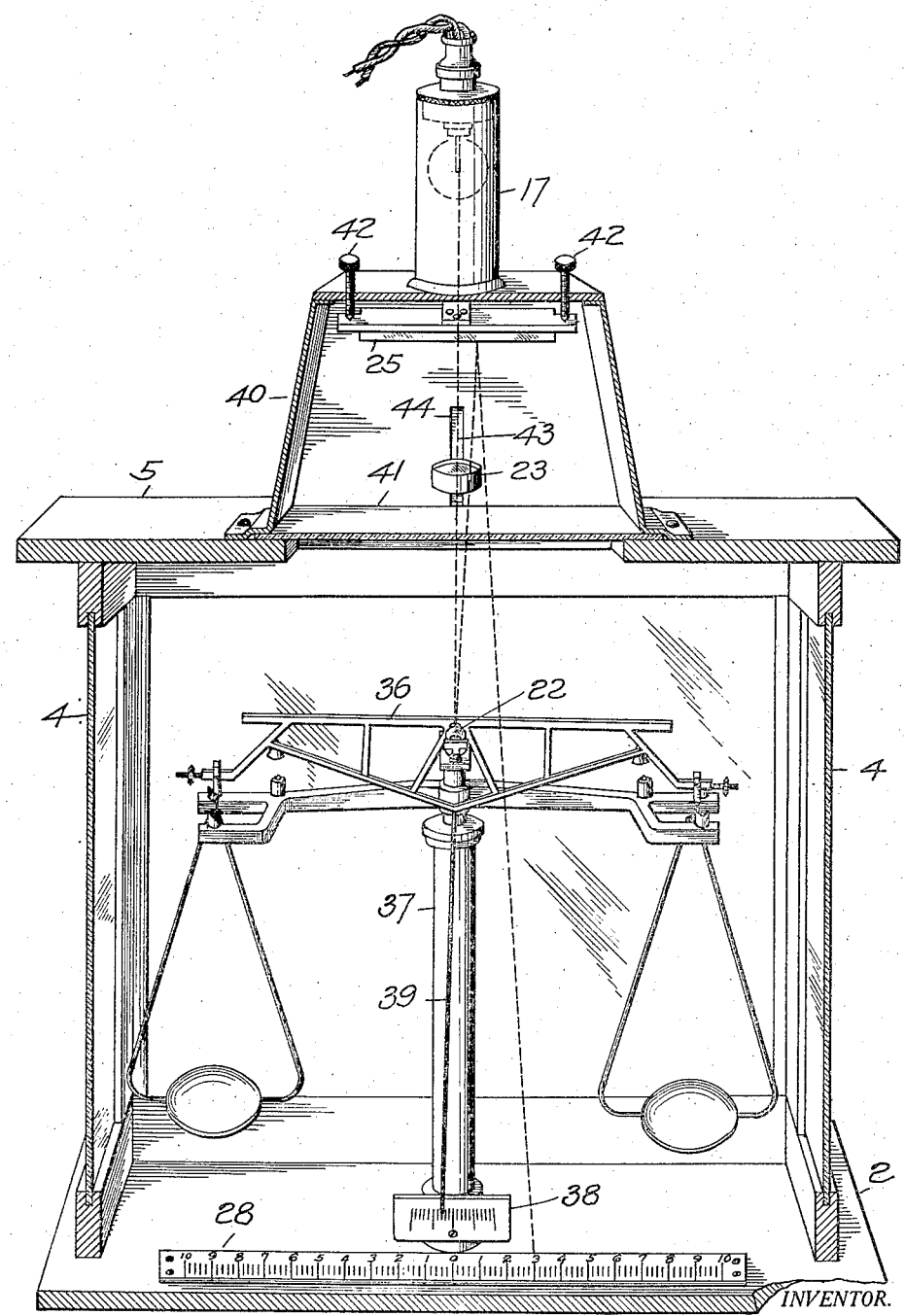

Patented Nov. 24, 1925.

1,562,936

UNITED STATES PATENT OFFICE.

ALFRED W. AINSWORTH, OF DENVER, COLORADO.

WEIGHING INSTRUMENT.

Application filed December 22, 1920. Serial No. 432,484.

*To all whom it may concern:*

Be it known that I, ALFRED W. AINSWORTH, a citizen of the United States, residing at Denver, in the county of Denver and State of Colorado, have invented certain new and useful Improvements in Weighing Instruments, of which the following is a specification.

This invention relates to precision weighing instruments and its main object is to indicate the beam oscillations of a balance of the type commonly used by chemists and assayers, through the instrumentality of a system of mirrors arranged relative to a source of light to reflect a light beam originated in said source onto a graduated scale.

Another object of the invention is to provide in a weighing system of the above-described character, certain adjustments which permit of varying the position of the reflected light beam to coincide with the zero mark of the scale when the beam is in its normal balanced condition.

With the above objects in view, my invention consists in the construction and arrangement of cooperating parts shown in their preferred form in the accompanying drawings in the various views of which like parts are similarly designated, and in which Figure 1 is a front elevation of a balance to which my invention is applied;

Figure 2, a section taken on the line 2—2, Figure 1;

Figure 3, a fragmentary sectional elevation of the lamp housing of the appliance, showing a modification in the construction of the means for shaping the light beam;

Figure 4, a transverse section along the line 4—4, Figure 3;

Figures 5 and 6, respectively, a side elevation and a plan view of a modified construction of the mirror of the system connected with the scale beam; and Figure 7, a sectional front elevation of a balance of low head room showing the modifications in the construction and arrangement of the elements of the present invention required for its application thereto.

Referring to the drawings, the reference numeral 2 designates the dust proof case of the weighing instrument which as usual is composed of a rectangular frame supported on a base 3 and provided with glass sides 4, a top 5 and a counterpoised sliding door which has been omitted in the drawings for clearness of illustration.

The weighing instrument comprises a pillar 6 supported on the base plate of the casing and provided with two sensitive level vials 7. The pillar has a knife edge bearing for the scale beam 8, and a standard 9 erected on the base rearward of the pillar, provides a support for an elevated scale 10 upon which the extent of oscillation of the beam is indicated through the medium of an upwardly extending pointer 12 connected at the center of the beam.

Pan hangers 13 are suspended at opposite ends of the beam and rider carriers 14 are mounted above the same in association with graduated scales 15 for the purpose of obtaining an accurate balance of the beam by the application of light weights at measured distances from its center of oscillation.

Pan arrests 16 connected with an adjusting mechanism in the base of the case, serve to support the pan-hangers when the beam is in a condition of rest.

All the parts so far described are constructed and arranged in accordance with the ordinary practice followed in the production of instruments of the type to which the present invention is applicable.

A preferably cylindrical lamp housing 17 superimposed upon the case is axially alined with a central opening 18 in the top thereof, said opening being covered by a plate 19 of glass or other transparent material laid in the bottom of the housing to exclude dust and heat from the delicate weighing mechanism in the case. The housing is closed at its upper end by a revolvable cap 20 from which is suspended an incandescent electric lamp 21 in communication with a conveniently located source of electric current.

The lamp has a single straight filament 21ª extending horizontally or at right angles to the axis of its housing to emit a flat beam of light which enters the casing of the instrument through the opening in its top.

Mounted in or near the center of the oscillatory scale beam is a forwardly slanting mirror 22 which is positioned so that a plane perpendicular to its reflective surface passes through the center of the opening in the top of the casing when the beam is in a balanced position.

A lens 23 centrally positioned in the same perpendicular intermediate of the opening and the mirror is adjustably suspended from a hanger 24 which is fastened to the top plate of the casing.

The lens serves to focus the light beam originated in the electric lamp and passing through the opening in the top of the case, in the mirror 22 which owing to its slanting position reflects the light beam upwardly in a direction forward of the balance as shown in broken lines in Figures 1 and 2 of the drawings.

The reflected light rays impinge upon a second mirror 25 placed in the line of their direction and slantingly mounted at the top of the casing so that the light beam once more reflected at its surface, will strike the bottom of the casing at a point adjacent to and forward of the pillar of the weighing instrument.

The secondary mirror is mounted on a flexible plate 26 and it carries two adjusting screws 27 which by contact with the top of the casing provide a ready means for varying its angle of inclination to the incident beam in order to center the reflected light beam on a graduated scale mounted forward of the pillar of the instrument.

This scale designated in the drawings by the reference character 28 is graduated in opposite directions from a central zero point and the light beam reflected by the second mirror 25 is centered by adjustment of the second mirror and the cap 40 in the lamp housing to coincide with the zero mark of the scale when the weighing beam is in its normal balanced position.

For convenience in construction the hanger 24 which carries the focusing lens and the spring 26 which supports the mirror 25 may both be attached to a plate 29 fastened against the underside of the top of the casing by screws 30 which enter into threaded apertures of a flange at the bottom of the lamp housing.

It will be apparent that in the operation of the instrument each oscillating movement of the scale beam is communicated to the mirror 22, that the light beam focused in said mirror is in consequence correspondingly displaced and that the light beam reflected by the stationary mirror 25 will move a proportionate but magnified distance along the scale 28.

Having thus described my invention in the best and simplest form at present known to me, I desire it understood that variations in the construction and arrangement of its cooperative elements may be resorted to in order to adapt the attachment for use in connection with instruments of different types and proportions.

The movement of the light beam along the scale 28 may for example be further magnified by the use of additional mirrors oppositely arranged to produce a double reflection of the light beam before it strikes the graduated scale.

The mirror 22 which is attached to the weighing beam at or near the center thereof may be adjustably mounted for the purpose of varying its angle of inclination.

A convenient method of accomplishing this object has been illustrated in Figures 5 and 6 in which the mirror 22 is mounted at the upper end of a C-spring 31 which is fastened upon a projection 32 of the scale beam.

Adjusting screws 33 extending through threaded openings in ears of the lower and stationary part of the spring engage the movable portion of the same to which the mirror is attached.

The flat and narrow light beam which in the hereinbefore described construction is produced by use of an incandescent lamp the filament of which is straight and horizontally disposed, may be formed through the medium of a lamp of the ordinary type as illustrated in Figures 3 and 4, by providing the housing in which it is enclosed, with a bottom plate 34 of opaque material which has a slot 35 of the desired form through which the light rays pass to the lens which focuses them in the mirror on the scale beam.

Figure 7 of the drawings illustrates the application of my invention to a balance in which the head-room within the casing is reduced by inversion of the pointer which indicates the degree of oscillation of the weighing beam on a relatively stationary scale.

The scale beam 36 in this type of instrument is mounted upon a column 37 at the foot of which the scale 38 is fastened and the pointer 39 extends downwardly in the center of the beam to cooperate with the scale.

In order to obtain the necessary distance between this source of light and the primary mirror 22 of the attachment the lamp housing 17 is elevated above the top of the casing through the medium of a hollow cap 40 which covers the opening of the same.

A plate 41 of glass or other transparent material closes the opening in the top of the casing as in the first-described form of the invention to protect the delicate weighing instrument from dust, dirt and the heat generated by the incandescence of the lamp.

The second mirror 25 is mounted in the pedestal by means of a flexible support as in the other construction but the adjusting screws 42 extend through threaded openings in the top of the pedestal and thus facilitate the adjustment of the mirror for the purpose of centering the light beam on the graduated scale 28. The lens which focuses the light beam generated in the lamp in the mirror on the scale beam is likewise disposed in the hollow pedestal and it is adjustable from without the pedestal by a sliding support 43 extending through a slot 44 in the wall of the same.

Having thus described my invention what I claim and desire to secure by Letters-Patent is:

1. The combination with a balance including a fulcrumed scale beam, of a source of light located above the center of the scale beam and having means for producing a vertical transversely linear beam of light, a mirror on the front of the scale beam at the center thereof in the path of the said beam of light, a lens interposed between the said mirror and the source of light to focus the transversely linear light beam onto said mirror, a second mirror located above and in advance of said scale beam and reflecting the reflection of the first mirror, and a graduated scale located at the front of the bases of the balance and positioned longitudinally thereof in the path in which the reflection of the second mirror travels by deflection of the scale beam to indicate the extent of said deflection in magnified measurement.

2. The combination with a casing, and a balance arranged within the casing and including a fulcrumed scale beam, a cylindrical lamp housing mounted upon the casing and arranged vertically above the center of the said scale beam and containing a source of light and provided at the lower end with means for producing a vertical transversely linear beam of light, a mirror on the front of the scale beam at the center thereof in the path of said beam of light, a vertical adjustable lens interposed between the source of light and the said mirror to focus the transversely linear light beam onto the mirror, a second mirror mounted within the casing and located above and in advance of the center of the scale beam and reflecting the reflection of the first mirror, and a graduated scale mounted upon the casing at the base of the balance and extending longitudinally thereof in the path in which the reflection of the second mirror travels by deflection of the scale beam to indicate the extent of said deflection in magnified measurement.

3. The combination with a casing, and a balance arranged within the casing, and including a fulcrumed scale beam, a cylindrical lamp housing mounted upon the casing, and arranged vertically above the center of said scale beam, and containing a source of light, and provided at the lower end with a wall having a slit for producing a vertical, transversely linear beam of light, a mirror on the front of the scale beam at the center thereof in the path of said beam of light, a lens interposed between the source of light and said mirror, a second mirror mounted within the casing and located above and in advance of the center of the scale beam and reflecting the reflection of the first mirror, a graduated scale mounted upon the casing at the base of the balance and extending longitudinally thereof in the path in which the reflection of the second mirror travels by deflection of the scale beam to indicate the extent of said deflection in magnified measurement, means for adjusting the lens vertically, and means for effecting an angular adjustment of the mirrors.

In testimony whereof I have affixed my signature.

ALFRED W. AINSWORTH